United States Patent
Eiselen

[11] 3,976,982
[45] Aug. 24, 1976

[54] APPARATUS FOR IMAGE MANIPULATION

[75] Inventor: Everett Truman Eiselen, Los Gatos, Calif.

[73] Assignee: International Business Machines Corporation, Armonk, N.Y.

[22] Filed: May 12, 1975

[21] Appl. No.: 576,931

[52] U.S. Cl. ............................. 340/172.5; 235/151
[51] Int. Cl.² ........................................ G06F 15/20
[58] Field of Search ........................ 235/151, 152; 340/172.5; 444/1; 445/1; 178/DIG. 22

[56] References Cited
UNITED STATES PATENTS 3,763,365   10/1973   Seitz ................................. 235/151

OTHER PUBLICATIONS

Herbst, N. et al., *Variable Core-Size Linear Transform Program*, in IBM Tech. Disc. Bull. 14(10): pp. 2994–2996, Mar., 1972.

*Primary Examiner*—R. Stephen Dildine, Jr.
*Attorney, Agent, or Firm*—R. Bruce Brodie

[57] ABSTRACT

An image can be represented by an M × N array $I(*,*)$ of image points, where each point $I(i,j)$ over the ranges $0 \leq i < M$ and $0 \leq j < N$ is a value or set of values representing the color and intensity of an elemental portion of the image. A black/white image can be represented by assigning to each point $I(i,j)$ a value of 1 or 0. Thus, $I(i,j) = 1$ represents a black elemental image area, while $I(i,j) = 0$ represents a white elemental area.

Image manipulation refers to that class of image processing operations which sequentially process the points of a rectangular array $I(0,0)$, $I(0,1)$, ... , $I(0,n-1)$, $I(1,0)$, ... , $I(M-1, N-1)$ in such a way that the resulting points must be mapped into coordinate points of the array. The image processing operations satisfying this constraint include the blanking of an image area, the, combining of two images, the changing of scale of an image by a rotational amount, rotation by 90°, and the creation of a mirror image.

Image manipulations in the invention are performed upon black/white images by logically combining a base image stored in an accumulating memory with a sequence from another raster source subject to selective size and translation changes. Such processing is subject to two constraints. First, the data must be in non-compressed form. Second, the processed data must not fall outside the memory space originally occupied by the base image in the memory. Optionally, the function of magnification/minification may be performed separately from the other image manipulations. This can be conveniently done by placing the magni/minifier between the external image source and a network, which network logically combines the serial information from the external source with the serially extracted base image information stored in the accumulating memory.

6 Claims, 13 Drawing Figures

AN APPARATUS FOR RASTER IMAGE MANIPULATION

TRANSLATION FUNCTION PERFORM BY THE
ACCUMULATING MEMORY

| F | sX | sY | RESULT | DESCRIPTION |
|---|----|----|--------|-------------|
| X | +1 | +1 | ⌐ | NORMAL ORIENTATION |
| X | +1 | -1 | L | MIRROR IN HORIZONTAL |
| X | -1 | +1 | ⌐ (reversed) | MIRROR IN VERTICAL |
| X | -1 | -1 | ⌐ (rotated) | ROTATE 180 DEGREES CLOCK |
| Y | +1 | +1 | ⌐ | ROTATE 90 DEGREES CLOCKWISE AND MIRROR IN VERTICAL |
| Y | +1 | -1 | L | ROTATE 270 DEGREES CLOCKWISE |
| Y | -1 | +1 | ⌐ | ROTATE 90 DEGREES CLOCKWISE |
| Y | -1 | -1 | ⌐ | ROTATE 90 DEGREES CLOCKWISE AND MIRROR IN HORIZONTAL |

ORIENTATION FUNCTION PERFORMED BY THE ACCUMULATING MEMORY

FIG. 3

```
INPUT
SOURCE          0 0 1 1  ⎫
ACCUMULATOR     0 1 0 1  ⎬ POSSIBLE BOOLEAN INPUT COMBINATION
                         ⎭
                $B_8 B_4 B_2 B_1$   BOOLEAN OUTPUT VALUES AS A FUNCTION
                                    OF INPUT COMBINATION
                         ╱─ HEXADECIMAL REPRESENTATION
EXAMPLES:       0 1 1 1   7  LOGICAL "OR"
                0 1 1 0   6  EXCLUSIVE "OR"
                0 0 0 1   1  LOGICAL "AND"
                0 0 1 1   3  REPLACE (SELECT SOURCE)
                0 1 0 1   5  EXTRACT (SELECT ACCUMULATOR)
                0 0 0 0   0  SET TO ZERO
                1 1 1 1   F  SET TO ONES
```

DEFINITION OF LOGIC UNIT CONTROL

FIG. 4

```
0 ──► 0  0        ENLARGE BY 2
      0  0        SC=10, R-1=1
0 ──►0  0  0      ENLARGING BY 3
     0  0  0
     0  0  0      SC=10, R-1=2
0 ──►0  0  0      ENLARGING BY 3 IN X
     0  0  0      AND 2 IN Y
0  0 ──►0         REDUCING BY 2
0  0              SC=00, R-1=1, R²=4
```
EXAMPLES OF ENLARGING AND REDUCING
FIG.5
PC = 00 - INTERNAL LOOP
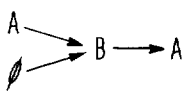
PC = 01 - INPUT
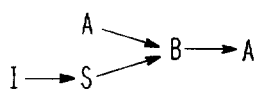
PC = 10 - OUTPUT
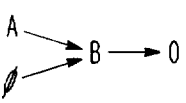
PC = 11 - EXTERNAL LOOP
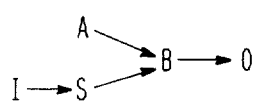
A = ACCUMULATING MEMORY
B = LOGIC UNIT
S = SCALE CONTROL
I = INPUT SOURCE
O = OUTPUT SINK
∅ = DATA FORCE TO ZERO
DATA PATH CONTROL
FIG.6

|  | BEFORE | | AFTER | | PARAMETERS | |
|---|---|---|---|---|---|---|
|  | SOURCE | ACCUMULATING | ACCUMULATING | OUTPUT | | |
| STEP 1 | | | | | PC=01<br>IA=1<br>X=1<br>Y=1<br>dX=1024<br>dY=1320 | F=0<br>SX=0<br>SY=0<br>SC=1<br>B=3 |
| STEP 2 | | | | | PC=10<br>OA=3<br>X=90<br>Y=275<br>dX=400<br>dY=840 | F=0<br>SX=0<br>SY=0<br>B=5 |
| STEP 3 | | | | | PC=00<br>X=1<br>Y=1<br>dX=1024<br>dY=1320 | F=0<br>SX=0<br>SY=0<br>B=0 |
| STEP 4 | | | | | PC=01<br>IA=3<br>X=100<br>Y=1190<br>dX=840<br>dY=400 | F=1<br>SX=0<br>SY=1<br>SC=1 |
| STEP 5 | | | | | PC=01<br>IA=2<br>X=100<br>Y=140<br>dX=660<br>dY=512 | F=1<br>SX=0<br>SY=0<br>SC=0<br>R-1=1<br>$R^2$=4<br>B=7 |

AN EXAMPLE OF IMAGE MANIPULATION

FIG. 7

ACCUMULATING MEMORY AND ADDRESS CONTROL

LOGIC UNIT

UNITY SCALE CONTROL WITH CONNECTIONS FOR ENLARGE AND REDUCE FEATURES

ENLARGER

REDUCE SCALE CONTROL

CLOCKING AND CONTROL

APPARATUS FOR IMAGE MANIPULATION

BACKGROUND OF THE INVENTION

This invention relates to the manipulation of images formed by two-dimensional arrays of Boolean coded points and, more particularly, to the manipulation of such images by bit stream processing.

In the prior art, the nature of electronic circuits has made it convenient to represent visual information such as documents, drawings, and pictures, by a two-dimensional array. The visual information, or image, is typically divided into rows and columns of small units or elemental areas, termed "picture elements" or "pels." Each picture element is assigned a value representative of its intensity (darkness) and its color. In a formal sense an image may be considered an M × N array $I(*,*)$ of image points, wherein each point $I(i,j)$ over the ranges $0 \leq i<M$ and $0 \leq j<N$ is a value or set of values representing the color and intensity of each pel. A black/white image is one in which $I(i,j)$ is a Boolean coded value. Typically, $I(i,j) = 1$ represents a black pel, while $I(i,j) = 0$ represents a white pel.

Images are most commonly generated by scanning pictorial data such as 8½ by 11 inch documents. Thereafter, the scanned pictorial data can be stored, viewed from a display, transmitted or printed. As a result of this form of presentation, electronic circuits can handle these picture elements one-by-one, rather than trying to handle the whole picture at a time. Typical examples of this one-by-one or sequential processing are television and facsimile transmission.

Since most scanners and printers process an image from left-to-right and from top-to-bottom, a M × N array of image points is normally serialized in standard "row major" sequence $I(O,O), I(O,1), \ldots, I(O,N-1), I(1,O), \ldots, I(M-1,N-1)$. The serialization for purposes of transmission and display in such diverse fields as facsimile and television have encouraged the use of synonyms in the literature. For example, image points constituting a cluster of consecutive rows or columns are said to form a "raster." Indeed, the term "raster operation" refers to the sequential processing of elements in consecutive array rows or columns. In this specification, the terms "raster coded information" and "raster operations" are deemed synonymous with the terms "points in an image array" and the "serial processing of such points in row major order."

There are many processes that can be performed on serialized, raster coded images. For example, geometric distortion can be corrected, periodic noise can be removed, and variations in light levels can be compensated. Such processes have been used with great benefit on photographs from space probes. The notion of manipulation of an image can be distinguished from the above processes, and may be defined by way of example as the set of operations which expand, shrink, justapose, cut up, or mosaic portions of an image. Such operations are familiar to viewers of home television receivers and occur in the composing rooms of newpaper and magazines. It becomes desirable, therefore, to be able to electronically manipulate arrays of digital points in much the same manner that home television can create special effects or that a composing room can cut and paste photographs. These operations when performed by electronic systems are referred to as "electronic cut-and-paste."

Operations on large arrays of points have been handled by ordinary, general-purpose digital computers. However, the cost per manipulation is high due to the large number of processing steps which a general purpose structure must exercise for each and every picture element in an array. Recognizing that even an 8½ × 11 inch page requires well over $10^6$ pels at 120 pel per inch resolution, then apparatus which could save information handling steps would become economically attractive.

The prior art yields no clue as to the set of operations which may be performed upon an array field, an efficient processing architecture emphasizing simplified hardware, the reduction of the number of operations required and the avoidance of self-destruction of image information. What is available in the prior art may be found, for example, in Belleson, U.S. Pat. No. 3,697,678. Belleson describes the use of an addressable memory as a buffer for assembling image arrays which, in turn, can drive a raster output device.

SUMMARY OF THE INVENTION

It is accordingly an object of this invention to devise an image manipulating apparatus capable of blanking an image area, combining two images, changing scale, translation, rotation, and creation of a mirror image. It is another object to devise an apparatus in which points of any manipulated image are mappable into unique points in the array without requiring interpolation. Relatedly, such an apparatus should avoid the potential self-destruction of image information occasioned by the translation, rotation, or mirroring of images in place.

The foregoing objects are satisfied by an embodiment which manipulates black/white images by bit stream processing. The apparatus includes an accumulating memory for storing a base image, an external source of coded sequences, and a network which logically combines the base image with the coded sequences from the external source for such operations as translation, rotation, mirroring and combining of two images. Other manipulative operations such as inversion merely require streaming the bits from the selected portion of the accumulating memory through the network, performing the indicated logical operation, and streaming the bits back to their same coordinate locations. Parenthetically, the execution of translate, rotate, and mirror operations by the logical combining of the serialized base image with an external coded stream avoids the potential self-destruction of those image points in the manipulated image located at coordinates overlapping points in the base image.

The amount of information required to represent the page of a business letter as a black/white image at a resolution of 120 pels per inch is well over 1 million bits. Because of the inherent two-dimensional redundancy of such as array, the amount of information can be reduced by compression techniques to about one-tenth. Such redundancy reduction is used primarily for transmission and storage, rather than for manipulation. Among the reasons advanced for the necessity to manipulate images in their uncompressed form is the fact that uncompressed data contains relational information among clusters of points, which information is frequently lost when data is compressed, and must be reinserted.

It is an aspect of the invention that the function of magnification/minification may be performed separately from other image manipulations. Conveniently, this is done by placing the magni/minifier between the external raster source and the combining network. In this regard, the alteration of magnification attributable to an image is accomplished by whole integer replication of existing image elements so that the resulting image points will fall on raster points.

The accumulating memory, which stores the base image, includes means for selectively addressing linear sequences at any arbitrary starting address along either of the array dimensions. Since serial bit stream processing is central to the architecture, it is also desirable to include means for extracting selectively addressed sequences from the memory and for replacing information at the same or other address locations at a continuous rate. In addition to the network for logically combining serial information from the external source and the accumulating memory, there are included means for specifying the logical function to be performed by the combining network and for designating the addresses for both extracting data from and for writing the logically combined sequences into the memory. The apparatus of the invention thus permits image manipulation to be reduced to a series of parameters. By this is meant a series of numbers which can be conveniently supplied to the apparatus controller by a CPU or even an operator-driven keyboard.

BRIEF DESCRIPTION OF THE DRAWINGS

FIG. 3 sets forth the orientation function performed by the accumulating memory.

FIG. 4 defines the logic combining network.

FIG. 5 shows examples of enlarging and reducing of scale control 3 set forth in FIG. 1.

FIG. 6 depicts data path control.

FIG. 7 shows examples of image manipulation.

DESCRIPTION OF THE PREFERRED EMBODIMENT

Figure 1:
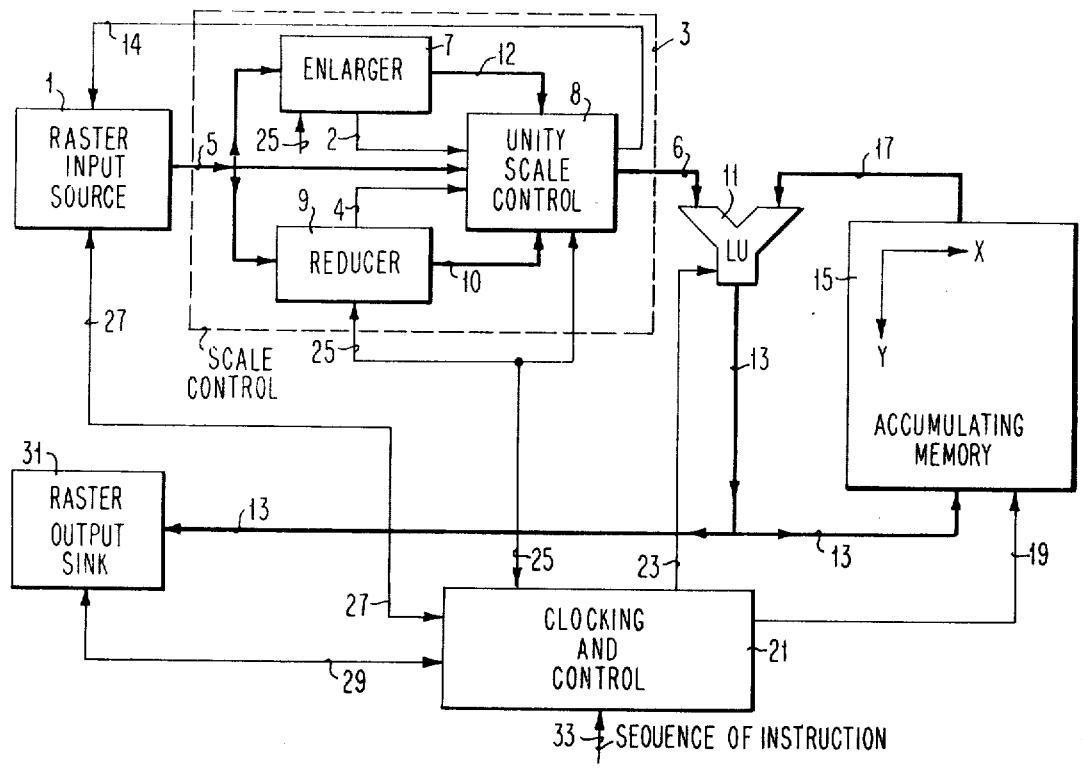
FIG. 1 shows the system logic of the preferred embodiment.

Referring now to FIG. 1, there is shown a system architecture for the image manipulating apparatus. The M × N array of image points, hereinafter termed the "base image" is stored in accumulating memory 15. This memory may be of the bit addressable type in order to facilitate the extraction of subarray geometries anywhere within the array field. In this invention, the subarray geometry of interest is limited to rectangles.

A logic combining unit 11 facilitates the execution of logical operations upon one or more bit streams simultaneously applied thereto over paths 6 and 17. The output from the logical combining unit, also in bit serial form, is applied in parallel to raster output sink 31 and accumulating memory 15 over path 13.

Raster input source 1 driving binary sequences over path 5 through scale control 3 is responsible for the appearance of the bit stream on path 6. A clocking and control unit 21 responsive to a set of parameters applied to it over path 33 regulates the activation/deactivation, synchronism, and addressing of the raster information stored in accumulating memory 15.

The manipulations which the apparatus is capable of performing include translation, orientation, combination, scale change, and input/out. Translation is taken to be the extraction and placement of fields at specific locations in the master array. Orientation includes both the placement of image fields in the master array at any one of four 90° angle rotations and the forming of mirror images in either the horizontal or vertical. Combination refers to the merging of two image fields in any of 16 possible ways. The ability to scale change means that the size of an image field can be altered by an integer ratio. Lastly, input/output implies that image fields can be entered from a raster input source or extracted and applied to a raster output sink.

It is apparent by delimiting the class of images to black/white images, there is a substantial reduction in the amount of memory storage because only one bit per pel, rather than several bits per pel, is required to encode each element. Also, the areas extracted from the array are limited to rectangular subarray geometries. These rectangular subarrays will be referred to as "image fields." As is apparent, rectangular subarray geometry greatly simplifies the accessing of the pels within the field in view of the fact that the Cartesian coordinates of the edges remain constant. In contrast to the random access of the image field within the master array, the pels are accessed sequentially within the subarray geometries. Consecutive pels are called the "scan line." Also within the image fields, scan lines are accessed sequentially. This limitation permits pels to be addressed by incrementing simple counters. Apparatus for performing image manipulation processes a single field at a time, rather than processing several fields at once. This constraint avoids the requirement to multiplex the scan lines from several fields into a single scan line for the master array. The apparatus of the invention is also constrained in that the pels from any manipulation process fall on raster points, rather than permitting them to fall between raster points. This mapping avoids the need for interpolation logic. However, this limit restricts any enlarging and reducing to integer ratios, as well as requiring rotation to be in 90° increments.

Figure 2:
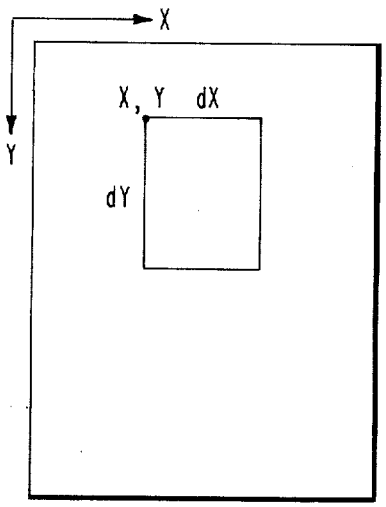
FIG. 2 illustrates the translation function performed by the accumulating memory.

Referring now to FIG. 2, taken together with FIG. 1, there is shown the translation function performed by the accumulating memory. In this regard, translation is controlled by the four parameters X, Y, dX, dY. The first picture element of an incoming image field is placed at the starting coordinates X,Y. The size of the image field as modified by the scale control 3 is determined by the parameters dX and dY, where dX gives the extent in the X direction of the image field and the accumulating memory, and dY gives the extent in the X direction.

Referring now to FIG. 3, there is shown the orientation function performed by the accumulating memory. The orientation is controlled by three parameters. These are, namely, F, sX, sY. F designates the coordinate direction which is to be incremented first as the sequential picture elements are received, thereby specifying the coordinate along which the scan line will be.

The parameter sX gives the sign for incrementing the X coordinate as either a plus or minus 1. The parameter sY performs the same function for the Y coordinate. FIG. 3 illustrates how the result would appear in the accumulating memory if the incoming image field contained the letter F. The sequence of pels for the incoming image field are always treated as though they were left-to-right, top-to-bottom. In matrix terminology, this is defined as "row major order." In FIG. 3, the orientation change is relative to those scan directions because there can be no absolute coordinates for the incoming image field. Its only reference is the picture element sequence.

Referring now to FIG. 4, there is shown the symbolic definition of logic combining network. The logic unit combines two image fields, picture-element by picture-element. The process used for the combination is specified by the Boolean function parameter B since the two black/white fields are treated as two 2-valued data streams. In the preferred embodiment, the combining process is performed by pure combinatorial logic so that there are no timing considerations other than those of insuring that the corresponding pels from the two images be presented at the same time to the network. As a result, the output is available later after some appropriate circuit delay time. The output can be replaced in the accumulator memory 15 or applied to output sink 31.

Output sink 31 preferably may consist of a presentation device such as a raster printer or display. Also, the sink must be able to accept data with a rate faster than the maximum data rate of the apparatus so as to tolerate variations in data flow and avoid the need for internal buffering on any of the major data paths 5, 6, 17, and 13.

Input source 1 contemplates raster scanners and raster generators of encoded alphanumeric and vector graphics data. The input source 1, similar to sink 31, must be operable at a data rate greater than the maximum data rate of the apparatus.

Scale control 3 changes the size of the incoming image. The size can be enlarged, reduced or left the same. Because of the constraint that any processed picture element must fall on a pel position, enlarging or reducing is equivalent to multiplication and division by integer values. Scale control can be inserted in the output leg, such as in path 13 as an alternative to the input leg on path 5.

Referring now to FIG. 5, there are shown examples of scale change. In enlarging, one picture element is made into many. Because it is impossible to create information that does not exist in the original image, all of the resulting picture elements are given the same value as the original pel. In the reducing operation, several picture elements are logically combined to just one. Reduction is the process for discarding information. Consequently, care must be exercised to preserve as much useful information as possible.

In the scale control operations exemplified in FIG. 5, the control is responsive to parameters SC, R-1 and $R^2$. The parameter SC determines whether the scan control enlarges, reduces, or preserves the existing size. In the instant case, the scale change is constrainted to be the same in both the x and y directions. The parameter R-1 is one less than the size ratio and is used wherever unity scale is not preserved. The parameter $R^2$ is the ratio of areas and is used to determine when more than half of the picture elements are black during reduction. It is not used for either enlarging or unity scale.

Both enlarging and reducing involve storing data. In enlarging, data is stored as it comes into enlarger 7 so that it can be replicated. In enlarging, data is read out faster than it is read in. During the time when scan lines are being replicated, no data is being read in, causing thereby an interruption in input data flow.

In the reducing operation, all of the scan lines that will be reduced to a single scan line are read in before any data is read out. Thus, the stored data is processed as the reduced scan line is produced, before any more data is read in causing thereby an interruption in input data flow.

Clocking and control element 21 sets up an operation by initializing each of the units as, for example, input source 1, scale control 3, accumulating memory 15, logic unit 11, or output sink 31. It conditions the input and output it required, and controls the data paths 5, 6, 17 and 13. Clocking and control thereupon gates the master clock so as to allow the operation to proceed. Sufficient intelligence is provided for clocking and control to determine whether the pel clock during each scan line, scan clock at the end of each scan line, or raw clock should be distributed to the elements involved in the operation. Clocking and control also monitors the progress of the operation and signals the completion to the instruction source interface when the operation is completed.

Referring now to FIG. 6, there is shown examples of data path control exercised by clocking and control element 21. Relatedly, the selection of images to be processed and the data paths are determined by the parameters PC, IA, OA. The parameters IA and OA are the input address and the output address respectively. The two bits of the path control parameter PC specify whether the input or output have been selected. Since there are two images processed by the logic unit, one must always be from the accumulating memory, while the other is from the input. However, if the input is not selected, then that leg 6 of the logic unit is forced to 0. If the output 31 is selected, then the image is not replaced in the accumulating memory 15.

Referring again to FIG. 1, all of the parameters are entered over path 33 into clocking and control element 21. The source of parameters may be either a computer or an operator-driven keyboard. Since the size of the image area, as well as any reduction involved, affects the time it takes to perform an operation, then the parameter source must be prepared to supply parameters as needed. In the preferred embodiment, all of the parameters are presented in parallel under the control of two timing lines.

The foregoing paragraphs have been directed to some of the functional aspects of the embodiment. The following paragraphs are directed to illustrate the operation of the apparatus for raster image manipulation. Reference should be made to FIG. 7 which illustrates an example of image manipulation. The objective of the sequence is to take a page of text that has been previously converted to raster form and stored so as to be available to the apparatus at input address 1. The page of text consists of two columns where each row of text is represented by a short line in FIG. 7. A portion of the left-hand column is to be extracted, rotated 90° counterclockwise and placed on the left-hand side of a new page. A diagram that has previously been stored at input address 2 is to be reduced by a factor of two, rotated ninety degrees counterclockwise and placed on the right-hand side of the new page. Fur purposes of this example, it is desired that the diagram would look better switched right-for-left, so a mirror image is created before it is placed on the page. The size of the accumulating memory is assumed to be 1024 × 1320 picture elements. The coordinates are given with increasing X to the right and increasing Y down the page. The accumulator memory 15 is cleared before the sequence starts. However, since the first step is a full load of the accumulator memory, its initial status is not important. In this regard, FIG. 7 shows the accumulator memory before and after each operation. The memory after one step is identical to the accumulator before the next step.

The status of the source 1 and output 31 are shown when they are involved in the step. It should be noted that the value of each parameter required for a step is also listed. Parameters which are not included are not used in the step.

Step 1: The accumulator is loaded (B=3) from the input (PC=01) address 1(IA=1) in a raster image storage device (not shown). The input image is the same size as the accumulator memory 15($dX$=1024, $dY$=1320), so that no scale change is required (SC=1). The loading starts in the upper left-hand corner (X=1,Y=1) and proceeds in row major order (F=0,$sX$=0,$sY$=0).

Step 2: A portion of the left-hand column of text is extracted from the accumulator memory 15. The area involved is shown in the doted lines in the "before" accumulator memory column. The process starts at (X=90,Y=275) and covers the area ($dX$=400,$dY$=840). The normal sequence is followed (F=0,$sX$=0,$sY$=0). The area is extracted (B=5) and sent to the output (PC=10) storage address 3(OA=3) to temporarily hold this intermediate result for use in step 4.

Step 3: The whole data memory 15 is cleared by setting it equal to 0(B=0). No input or output is involved (PC=00). The process starts in the upper left-hand corner (X=1,Y=1) and continues for the full area of the accumulator memory ($dX$=1024,$dY$=1320). In the normal sequence (F=0,$sX$=0,$sY$=0). Although the process could have started in any corner and have progressed in an appropriate sequence, the normal sequence is chosen for convenience.

Step 4: The partial column of text temporarily stored in step 2 is now loaded (B=3) from input (PC=01) storage address 3(IA=3). The size of this field is the same size as the one extracted ($dX$=840,$dY$=400). However, the coordinates are reversed because it is rotated as it is placed in the accumulator memory 15. The rotation is achieved by scanning along Y(F=1) in the negative Y direction ($sY$=1). Successive scan lines are placed in increasing X positions ($sX$=0). The partial column of text is placed in the proper location by starting at (X=100,Y=1190). The size is not changed during input (SC=1).

Step 5: The diagram is loaded from the input (PC=01) storage address 2 (IA=2). It is reduced to one-half size (SC=0,R−1=1,$R^2$=4) as it is loaded. For variety, it is decided to logically OR (B=7) the incoming data with that existing in the accumulator memory. However, since that area of the accumulator memory is presently all zeros, the result is the same as a replace (B=3). The incoming image is the same size as the accumulator memory that is reduced by a factor of two so that the size of the field in the accumulator memory is ($dX$=660,$dY$=512) where the reversal of coordinates is caused by the rotation.

Rotation requires that scanning take place along the Y coordinate. Also, the mirror image is produced by scanning to increasing Y(SY=0) while successive scan lines are placed in increasing X positions (SX=0). Lastly, the appropriate starting location is X=100,Y=140.

Figure 8:
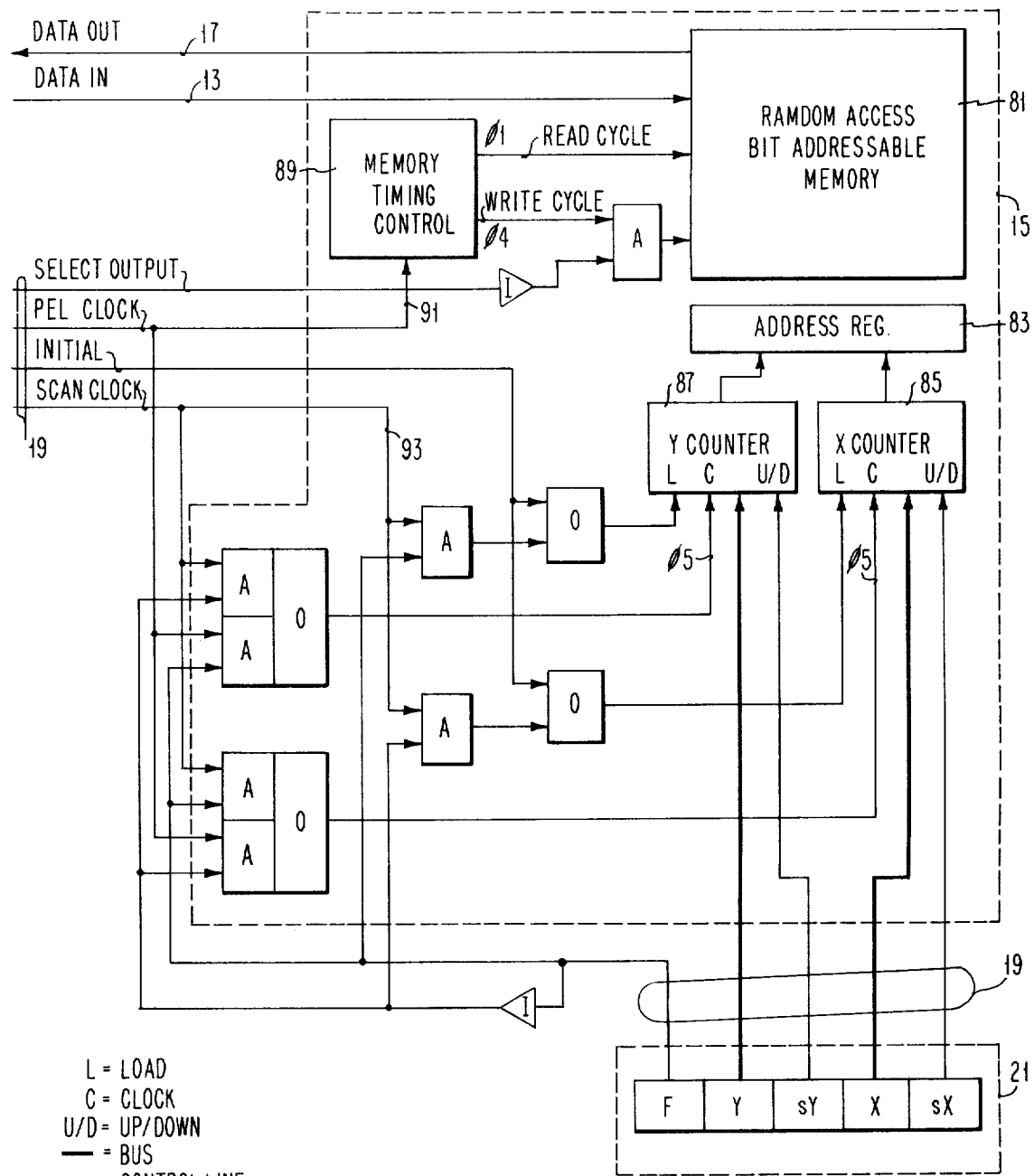
FIG. 8 sets forth the detailed logic of the accumulating memory and address control 15.

Referring now to FIG. 8, there is shown a detailed logic diagram of the accumulating memory 15 and the associated address control. The parametric inputs F, Y, $sY$,X,$sK$ are supplied by control logic element 21 over collective path 19 to corresponding y and x counters through appropriate control logic activated by pel and scan clocks from clocking and control unit element 21. The accumulating memory includes a random access bit addressable memory 81 for storing data serially by bit applied to it over path 13 and for supplying data serially by bit out over path 17. The X and Y coordinates are applied to address register 83 from the corresponding x and y counters 85 and 87. The counters, themselves, are of the up/down type with synchronous loading.

The memory is initialized by loading X and Y values into counters 85 and 87, respectively. Parameters F, $sX$,$sY$ are held at a constant value all through the operation. It should be observed that the pel clock activates memory timing element 89, which element controls the read cycle during phase 1 of pel clock and the write cycle during phase 4. The scan clock operates to gate appropriate parameters from element 21 to counters 85 and 87 for the purpose of either loading, incrementing or decrementing the register count.

After initialization, in response to each pel clock pulse received over path 91, memory 81 is first read and then written into at the current address contained in register 83. Additionally, the contents of registers 85 and 87 are changed as a function of the parameters in F,$sX$, and $sY$.

If F=0 and $sX$=0, then the x count in register 85 is incremented by phase 5 of the pel clock. If F=0 and $sX$=1, then the x count is decremented by phase 5. Likewise, if F=1 and $sY$=0, then the y count in register 87 is incremented by phase 5, while if F=1 and $sY$=1, then the y count is decremented by phase 5.

When a scan clock pulse is received over path 93, then the registers 85 and 87 have their contents altered as a function of F,$sX$ and $sY$, as follows:

If F=0, and $sY$=0, then the x count is loaded in register 85 and the y count is incremented by phase 5. If F=0 and $sY$=1, then the x count is loaded and the y count is decremented. If F=1 and $sX$=0, then the y count is loaded and the x count incremented. Lastly, if F=1 and $sX$=1, then the y count is loaded and the x count is decremented.

Figure 9:
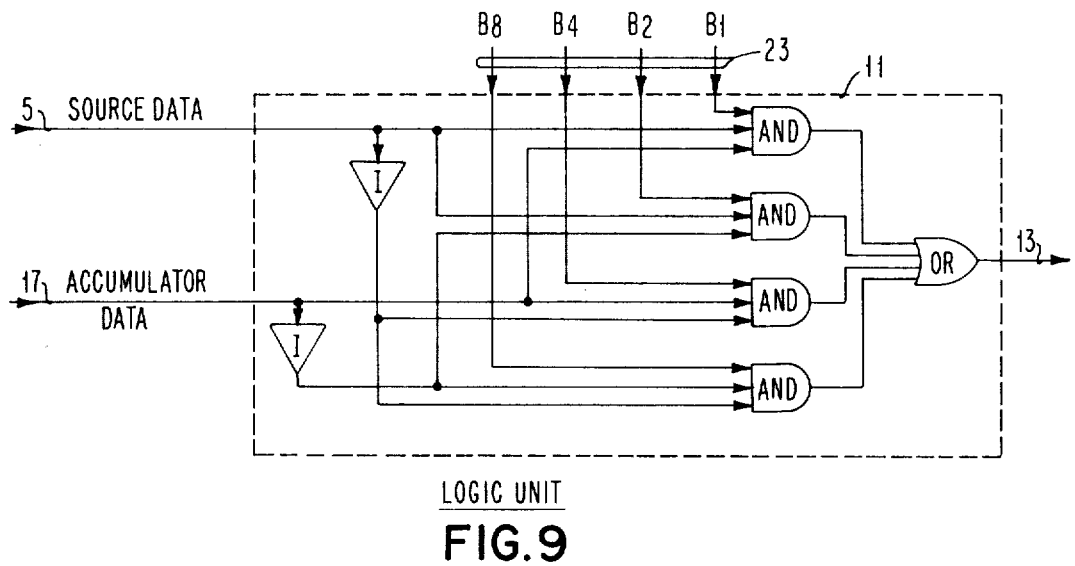
FIG. 9 sets forth the detailed logic of logic unit 11.

Referring now to FIG. 9, when taken together with FIG. 4, there is shown a logic unit 11 to which serial data from the scale control element 3 is applied over path 6 and serial data from the accumulator memory 15 is applied over path 17. The output of the logic unit is applied to data path 13.

Logic unit 11 can have its function configured by the signals applied to the plurality of conductors $B_8$, $B_4$, $B_2$, and $B_1$ shown as control path 23 running from clocking and control element 21.

For example, if the control leads $B_8$, $B_4$, $B_2$, $B_1$ are coded as 0111, then the logic unit represents a logical "OR": If the control leads are coded as 0110, then an exclusive "OR" is set up, etc. Other control combinations include 0001 for a logical "AND," 0011 for "replace," 0101 for "extract," 0000 for "set to 0," and 1111 "set to 1's."

Figure 10:
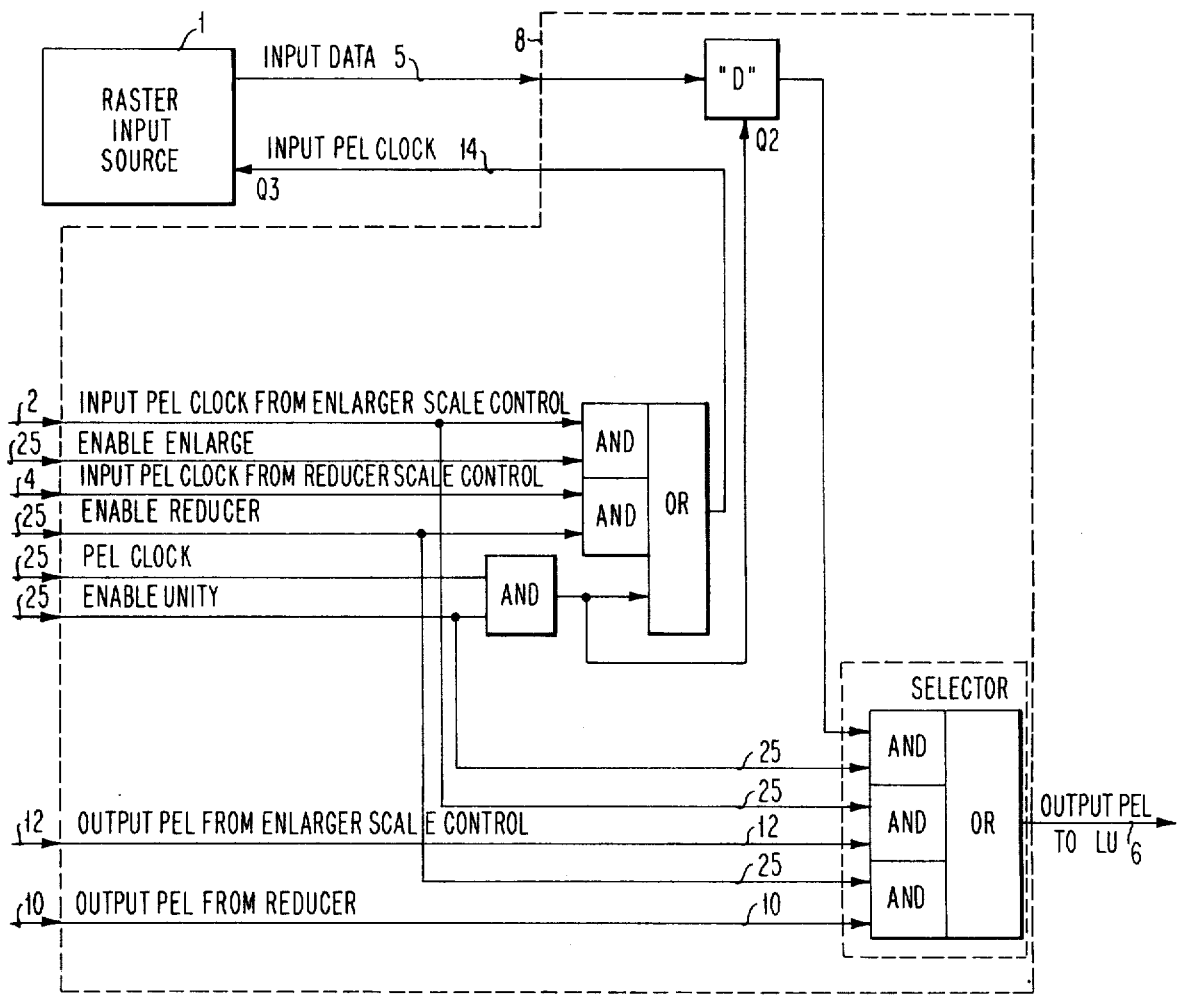
FIG. 10 sets forth the detailed logic of unity scale control with connections for enlarge and reduce features.
Figure 11:
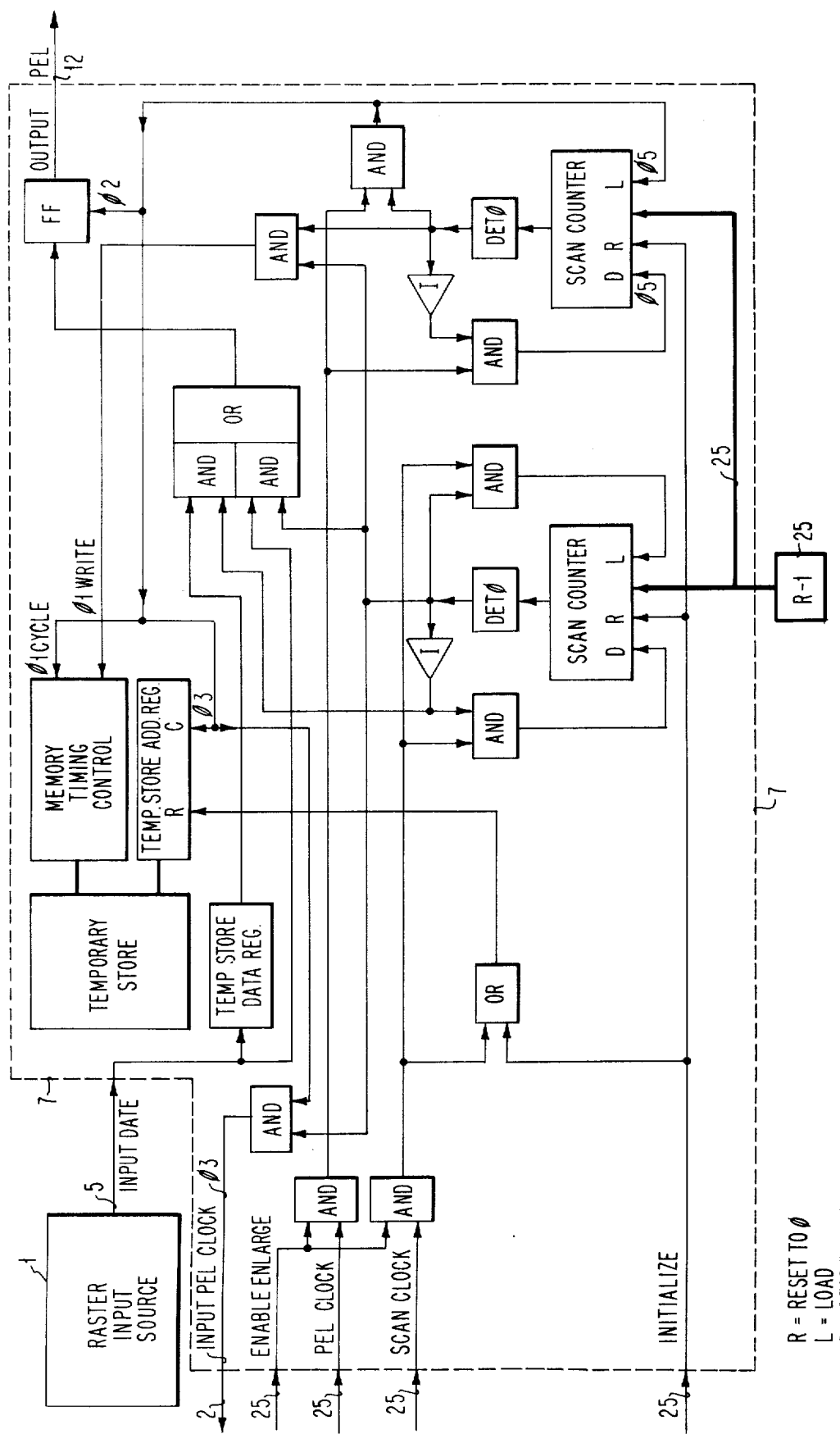
FIG. 11 shows the detailed logic of the enlarger 7.
Figure 12:
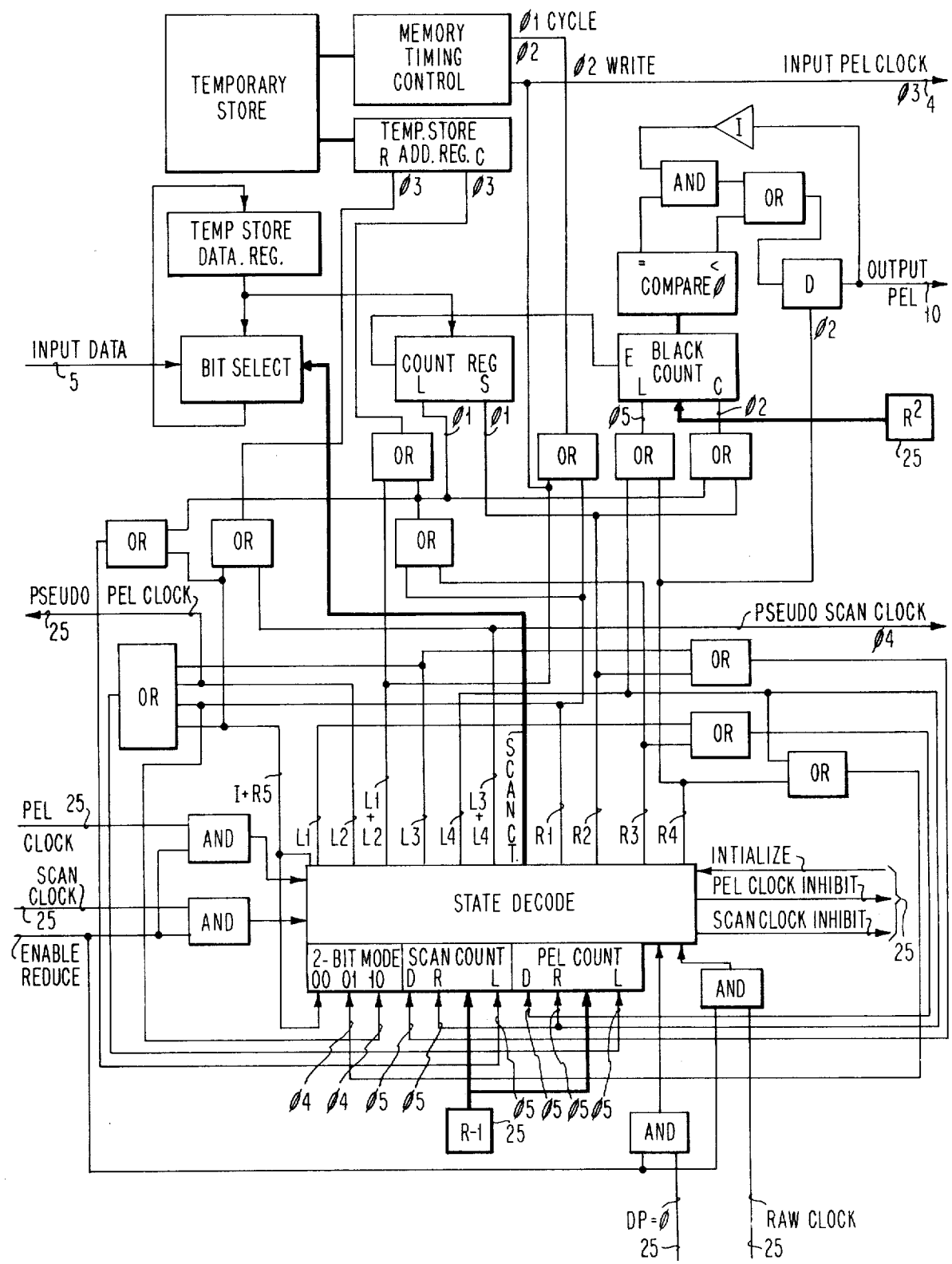
FIG. 12 depicts the detailed logic of reducer 9.

Referring now to FIGS. 10–12, there is shown the detailed logic level embodiments of scale control element 3 of FIG. 1. More particularly, FIG. 10 sets forth the detailed logic of unity scale control with connections for enlarge and reduce features. FIG. 11 shows the detailed logic of the enlarger 7, while FIG. 12 depicts the detailed logic of reducer 9. As previously mentioned in discussion with FIG. 5 showing examples of scale change, there are three paramenters regulating scale control operations. These parameters are, respectively, SC, R-1 and R². The parameter SC determines whether the scan control enlarges, reduces or preserves the existing size. Parameter R-1 is one less than the size ratio and is used whenever unity scale is not preserved. Lastly, the parameter R² is the ratio of areas and is used to determine when more than half of the picture elements are black during reduction. It is not used for either enlarging or unity scale.

Parametric control is supplied from clocking and control unit 21 to scale control element 3 over path 25.

Referring now to FIG. 10, the input pel clock from enlarger scale control of FIG. 11 is supplied to path 2 and through an AND/OR cluster to raster input source 1 over path 14. Other clocking control includes the pel clock on path 25 applied to latching element D. Since unity scale implies no change in the image, it amounts to a resynchronizing opportunity and a convenient connecting point for the bit streams from enlarger 7 over path 12 and reducer 9 over path 10, all of the foregoing being coupled to the logic unit 11 via path 6.

Referring now to FIG. 11 there is shown enlarger 7 responsive to raster input source over path 5 and generating an output over path 12 which terminates in the unity scale element described in FIG. 10. Since parameter SC determines whether to enlarge or reduce, if selected, the enlarger parameter is regulated by R-1 shown driving a scan counter. As suggested in enlarging, data must be read out on path 12 faster than it is read in on path 5. This derives from the fact that enlarging consists of replication of picture elements by an integral number of times. The input data is stored in temporary store so that scan lines can be replicated an integral number of times. During scan line replication, no input is taken into the enlarger. The enlarger is enabled over path 25 by the same AND gate logic that terminates the pel clock and the scan clock. A scan counter and pel counter regulated by parameter R-1 control the replication.

Referring now to FIG. 12, there is shown the reduced scale control 9. Scale reduction proceeds in two steps. First, R scan lines are loaded into temporary store, one scan line at a time. The loading proceeds by reading the contents of the memory into the temporary store data register. The input data is inserted into the bit position determined by the scan count directed to the bit select. Then the modified temporary store data register is written into the temporary store. During this period, the pel clock is inhibited. The pseudo pel clock is used to count the pels in the reduced scan line by decrementing DP in FIG. 13. The relation of input pels to reduced pels is maintained by the pel count. At the end of each scan line, the pseudo scan clock is used to restore the counting of pels in the reduced scan line by loading DP in FIG. 13, but it does not decrement DS in FIG. 13 because the reduce element has not yet produced the reduced scan line. This process is continued until the scan count is decremented to zero.

Figure 13:
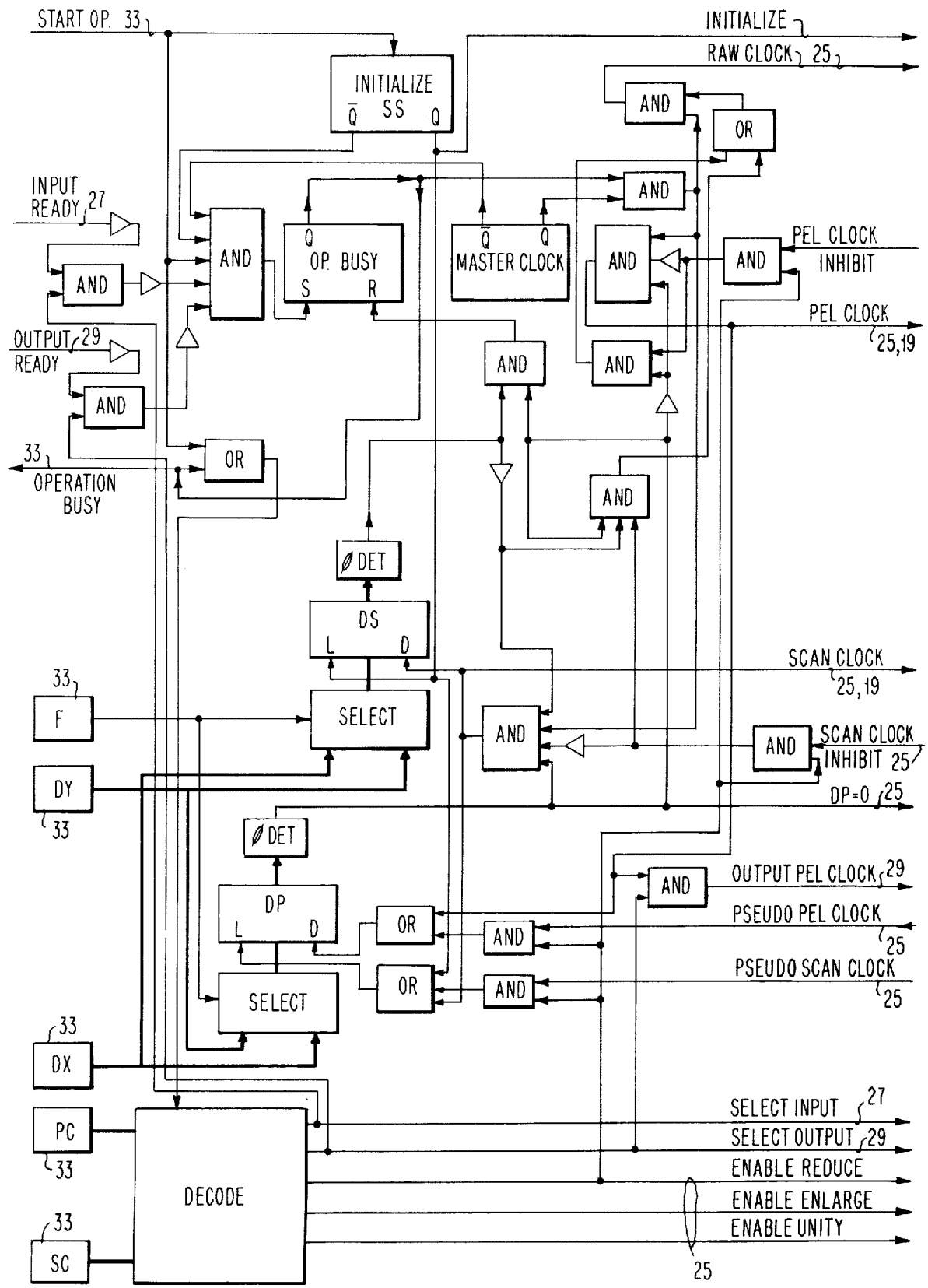
FIG. 13 exhibits the detailed logic of clocking and control network 21.

The second step actually generates the reduced scan line. Before each group of R² pels are examined to determine whether a black or white output pel should be produced, the black count is loaded with R². Then, one pel from each of R scan lines is read from the temporary store into the count register. In the count register each pel in sequence is shifted into the left-hand position where, if it is a black pel, it enables the black count causing it to be decremented by 2. After R groups of R pels have been examined, the contents of the black count is compared to zero. If the black count is less than zero, a black pel is placed on output pel line 10; if greater than zero, a white pel is placed on output pel line 10; if equal to zero, then a pel value opposite to the current pel value is placed on output pel line 10. This process continues until a reduced scan line is produced, at which time the counter DS in FIG. 13 is decremented. The above process is repeated until all scan lines in the input image have been processed as indicated by counters DS and DP, FIG. 13, being decremented to zero.

State Decode Table for FIG. 12

I = Initialize
L1 = (Mode = 00) & (pel count ≠ 0) & (DP ≠ 0) & raw clock
L2 = (mode = 00) & (pel count = 0) & (DP ≠ 0) & raw clock
L3 = (mode = 00) & (scan count ≠ 0) & (DP = 0) & raw clock
L4 = (mode = 00) & (scan count = 0) & (DP = 0) & raw clock
R1 = (mode = 01) & (scan count = 0) & (pel count = 0) & raw clock
R2 = (mode = 10) & (scan count ≠ 0) & raw clock
R3 = (mode = 10) & (scan count = 0) & (pel count 0) & raw clock
R4 = (mode = 10) & pel clock
R5 = (mode = 01) & scan clock
L1+L2 = (mode = 00) & (DP ≠ 0) & raw clock
L3+L4 = (mode = 00) & (DP = 0) & raw clock Referring now to FIG. 13, there is exhibited the detailed logic of clocking and control network 21. Parameters F, dY, dX, PC and SC are applied over paths 33. It is through this interface that all parameters are entered. The other function of this element is that of providing clocking and synchronizing signals to be distributed to all elements in the system; so that given a master clock, submultiple frequencies of interest can be derived and transmitted. Thus, raw clock is gated through from the master clock while the pel clock, scan clock are derived submultiples and transmitted over paths 25 and 19.

Decode Table for FIG. 13

Select Input = (PC = 01+11) & (Start Op.+Op. Busy)
Select output = (PC + 10+11) & (Start Op.+Op. Busy)
Enable Reduce = ((PC=01+11)&SC=01) & (Start Op.+Op. Busy)
Enable Enlarge = ((PC=01+11)&SC=10) & (Start Op.+Op. Busy)
Enable Unity = ((PC=01+11&SC=00) & (Start Op.-+Op. Busy)

Clocking and control circuit 21 sets up the manipulation operation when signalled to do so. In terms of signal flow, it selects the signal source and notes input ready when received. It selects the sink and notes the output ready when received. Clocking and control further initializes the accumulating memory 15, the enlarger 7 and the reducer 9. In performing the operation, the clocking and control circuit sends the pel and scan clock to those units involved.

It should be appreciated that the pel clock provides a cycle for each pel read from the accumulating memory 15. Many events occur for each pel clock cycle. Thus, the pel clock consists of five phases in order to allow for the circuit delays involved in the events which occur in a single pel clock cycle. The pel clock is shown in the diagrams as though it were a single phase except the phase used by various units, for example, $\phi_2$ is shown at the pel clock input to the unit in FIGS. 8, 11 and 12. Relatedly, the scan clock cycle occurs at the end of each scan line. There is no data transfer. The scan can be along either the X or the Y direction in the accumulating memory 15 depending upon which coordinate is sequenced first. Since there is only a reinitialize function performed by the scan clock, it can consist of a single phase. Also, it should be noted that a pel clock can be inhibited by the reduced function, if selected. When reducer 9 is selected and the pel clock inhibited, then clocking and control network 21 sends "raw clock" to the reducer unless the conditions for scan clock exist. In the latter case, scan clock is sent unless scan clock is inhibited in which case raw clock is again transmitted. The assumption is that once conditions are present to initiate a clock cycle, then all phases will be produced even if the initiating conditions cease in the middle of the cycle.

The foregoing has described the system of this invention and has illustrated its concrete implementation. It is a matter of course that known circuits are selectively employed as the circuits of the above described block diagrams by those skilled in the art. It is needless to exemplify the detailed logic. Such circuits may be those shown, for example, in "Pulse, Digital, and Switching Waveforms, Devices, and Circuits for their Generation and Processing," Sections 18, 9 and 10, by Jacob Millman, Herbert Taub, published by McGraw Hill Book Company.

It will be apparent that many modifications and variations may be affected without departing from the scope of the novel concepts of this invention.

What is claimed is:

1. An apparatus for manipulating a two-dimensional array of Boolean coded points, comprising:
   memory means (15) for storing the array, said means including means (83, 85, 87) for selectively addressing linear subarrays in one of two directions and at an arbitrary starting address along either of the array dimensions;
   means (17, 11, 13, 21, 19) for extracting the selectively addressed sequences from the memory and for replacing information at the same or other selectively addressed locations in the memory at a continuous rate;
   a source (1) of Boolean coded information;
   means (3, 6, 11, 17) for logically combining in serial fashion the linear subarrays extracted from the memory means with serial information from the source; and
   control means (21, 23, 25, 19, 27, 29) for specifying the logical function performed by the combining means and for designating the addresses both for extracting data from the memory and for writing the logically combined sequences into the memory.

2. An apparatus for manipulating a two-dimensional array of Boolean coded points according to claim 1 wherein the apparatus further comprises:
   means (3) for altering the magnification attributable to Boolean coded information from the source by whole integer replication of existing array elements, said means being interposed between the source and the logical combining means.

3. An apparatus for manipulating a two-dimensional array of Boolean coded points according to claim 2, wherein the means for altering the magnification attributable to Boolean coded information from the source by whole integer replication of existing Boolean elements includes means (9, FIG. 12) for replacing a predetermined cluster of Boolean coded points by a single Boolean value.

4. An apparatus for manipulating a two-dimensional array of Boolean coded points, the apparatus comprising:
   memory means for storing the array, said means including means for selectively addressing linear subarrays in one of two directions and at an arbitrary starting address along either of the array dimensions;
   means for extracting the selectively addressed linear subarrays from the memory and for replacing information at the same or other selectively addressed locations in the memory means at a continuous rate;
   a source of Boolean coded information;
   means for logically combining in serial fashion the linear subarrays extracted from the memory means with serial information from the source;
   control means for specifying the logical function performed by the combining means and for designating the addresses both for extracting data from the memory means and for writing the logically combined sequences into the memory means; and
   means for altering the magnification attributable to Boolean coded information from the source by whole integer replication of existing Boolean elements, said means being interposed between the source and logical combining means.

5. An apparatus for manipulating black/white images by bit stream processing, said apparatus including:
   an accumulating memory for storing a base image;
   an external source of coded sequences; and
   a network for logically combining the base image a raster scan line at a time with the coded sequences from the external source for such operations as translation, rotation, mirroring, and combining of two images; the network further including means for streaming of bits from a predetermined portion of the image stored in the accumulating memory through the network, performing the indicated logical operation, and for streaming the bits back to their same coordinate locations in the memory, whereby the execution of translate, rotate and mirror operations by the logical combining of the serialized base image with the external coded stream avoids self-destruction of those image points in the manipulated image located at coordinates overlapping points in the base image.

6. An apparatus according to claim 5, wherein the accumulating memory for storing the base image includes means for selectively addressing linear sequences at any arbitrary starting address along either of the array dimensions.

* * * * *